United States Patent
Vojtisek (10) Patent No.: US 11,339,943 B2
(45) Date of Patent: May 24, 2022

(54) LIGHTING DEVICE FOR VEHICLES HAVING A PRIMARY AND SECONDARY HOLOGRAM

(71) Applicant: Carl Zeiss Jena GmbH, Jena (DE)

(72) Inventor: Petr Vojtisek, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 17/255,718

(22) PCT Filed: Jun. 27, 2019

(86) PCT No.: PCT/EP2019/067122
§ 371 (c)(1),
(2) Date: Dec. 23, 2020

(87) PCT Pub. No.: WO2020/002491
PCT Pub. Date: Jan. 2, 2020

(65) Prior Publication Data
US 2021/0270441 A1    Sep. 2, 2021

(30) Foreign Application Priority Data

Jun. 28, 2018 (DE) .......................... 102018115574.3

(51) Int. Cl.
| | |
|---|---|
| *G02B 5/32* | (2006.01) |
| *F21S 43/20* | (2018.01) |
| *F21S 43/235* | (2018.01) |
| *G02B 5/18* | (2006.01) |
| *F21V 8/00* | (2006.01) |
| *G02B 27/42* | (2006.01) |

(52) U.S. Cl.
CPC ............. *F21S 43/26* (2018.01); *F21S 43/235* (2018.01); *G02B 5/18* (2013.01); *G02B 5/32* (2013.01); *G02B 6/005* (2013.01); *G02B 6/0026* (2013.01); *G02B 27/4272* (2013.01)

(58) Field of Classification Search
CPC ................................ G02B 5/32; F21S 43/235
See application file for complete search history.

(56) References Cited

U.S. PATENT DOCUMENTS

| | | |
|---|---|---|
| 4,711,512 A | 12/1987 | Upatnieks |
| 5,101,193 A | 3/1992 | Smith et al. |
| (Continued) | | |

FOREIGN PATENT DOCUMENTS

| | | |
|---|---|---|
| CN | 104777535 A | 5/2017 |
| DE | 69311704 T2 | 10/1997 |
| (Continued) | | |

OTHER PUBLICATIONS

JPH06230225A with Translation (Year: 1994).*
(Continued)

*Primary Examiner* — Robert J May
(74) *Attorney, Agent, or Firm* — Kusner & Jaffe (57) ABSTRACT

The invention relates to a lighting device for motor vehicles. Said lighting device comprises a primary hologram for providing a lighting function when the primary hologram is illuminated with illumination light. The illumination light is directed towards the primary hologram via a secondary hologram system which comprises a coupling-in hologram, a waveguide substrate and a coupling-out hologram.

14 Claims, 8 Drawing Sheets

(56) References Cited

U.S. PATENT DOCUMENTS

| | | | |
|---|---|---|---|
| 5,106,174 A | 4/1992 | Smith | |
| 5,135,751 A * | 8/1992 | Henry | A61K 31/77 424/426 |
| 5,153,751 A * | 10/1992 | Ishikawa | G02B 27/0103 359/13 |
| 5,341,230 A | 8/1994 | Smith | |
| 5,347,435 A | 9/1994 | Smith et al. | |
| 5,634,708 A | 6/1997 | Kazutoshi et al. | |
| 5,711,592 A | 1/1998 | Yoshihiko | |
| 5,745,266 A | 4/1998 | Smith | |
| 6,062,710 A | 5/2000 | Hewitt | |
| 10,414,333 B2 | 9/2019 | Muegge | |
| 2002/0135830 A1 | 9/2002 | Endo | |
| 2005/0201120 A1 | 9/2005 | Nesterenko et al. | |
| 2006/0002101 A1 | 1/2006 | Wheatley | |
| 2006/0203486 A1 | 9/2006 | Lee | |
| 2011/0194163 A1 | 8/2011 | Shimizu | |
| 2012/0002197 A1 | 1/2012 | Havermeyer | |
| 2013/0016410 A1 | 1/2013 | Futerer | |
| 2014/0092321 A1 | 4/2014 | Kurashige | |
| 2014/0268867 A1 | 9/2014 | Marco et al. | |
| 2015/0124303 A1 | 5/2015 | Dimov et al. | |
| 2015/0220058 A1 | 8/2015 | Mukhtarov et al. | |
| 2017/0059759 A1 | 3/2017 | Ayres et al. | |
| 2017/0090096 A1 | 3/2017 | Fattal | |
| 2018/0058656 A1 | 3/2018 | Naron | |
| 2018/0074457 A1 | 3/2018 | Jolly et al. | |
| 2018/0239096 A1 | 8/2018 | Houbertz et al. | |
| 2019/0129360 A1 | 5/2019 | Karthaus | |
| 2019/0351814 A1 | 11/2019 | Furubayashi | |
| 2020/0409305 A1 | 12/2020 | Erler | |

FOREIGN PATENT DOCUMENTS

| | | |
|---|---|---|
| DE | 102011079127 A1 | 1/2013 |
| DE | 202014003241 U1 | 8/2015 |
| DE | 102014223933 A1 | 5/2016 |
| DE | 102014117842 A1 | 6/2016 |
| DE | 102016107307 A1 | 10/2017 |
| DE | 102016117557 A1 | 3/2018 |
| DE | 102016117969 A1 | 3/2018 |
| DE | 102018116670 A1 | 1/2020 |
| EP | 0407773 A2 | 1/1991 |
| EP | 0452815 A1 | 10/1991 |
| GB | 2540474 A | 1/2017 |
| JP | H03-121942 A | 5/1991 |
| JP | H06 230225 A | 8/1994 |
| JP | H07 192510 A | 7/1995 |
| JP | 2001074894 A | 3/2001 |
| WO | WO1998/025169 A1 | 6/1998 |
| WO | WO 2018/054985 A1 | 3/2018 |

OTHER PUBLICATIONS

Office Action dated Aug. 2, 2021 from corresponding Chinese Patent Appl. No. 201980046698.1.

International Search Report from corresponding International Patent Application No. PCT/EP19/67122, dated Oct. 18, 2019.

International Search Report from corresponding International Patent Application No. PCT/EP19/67965, dated Sep. 25, 2019.

Peercy M S et al: "Wavelength selection for true-color holography", Applied Optics, Optical Society of America, Washington, DC; US, Bd. 33, Nr. 29, Oct. 10, 1994.

Philippe Gentet et al: "New LED's wavelengths improve drastically the quality of illumination of pulsed digital holograms", Digital Holography and Three-Dimensional Imaging, Jan. 1, 2017.

International Search Report from related International Patent Application No. PCT/EP18/78420, dated Dec. 6, 2018.

* cited by examiner

LIGHTING DEVICE FOR VEHICLES HAVING A PRIMARY AND SECONDARY HOLOGRAM

FIELD OF THE INVENTION

The present application relates to a lighting device for vehicles, in particular motor vehicles. Such lighting devices may serve, for example, as a taillight, front light, direction indicators, brake light, or the like.

BACKGROUND OF THE INVENTION

The main purpose of such lighting devices lies in the field of driving safety, for example in the case of headlights, to enable the driver to see a route to be traveled in the dark and also to make the vehicle visible in particular in the dark to other road users or to provide other road users with information relating to the driving behavior, which is particularly the case with indicators or brake lights.

In addition to these functions, lighting design has also come to the fore in recent years. Various vehicle manufacturers are working on providing their vehicles with a characteristic "lighting signature," that means designing the lighting devices such that the light emanating from the lighting device has a characteristic shape which, for example, may be similar or identical for all vehicles of a company.

One possibility for implementing lighting signatures is the use of holograms, which generate holographic images from which the light of the lighting device appears to emanate. In this way, it is possible, for example, to make rear lights or brake lights appear to form outside the vehicle and/or to implement characteristic lighting signatures such as rectangles, three-dimensional signatures, lighting signatures with incorporated logos, and the like.

Such illumination devices typically comprise the hologram itself, which generates the desired lighting signature, and an illumination device for illuminating the hologram.

Such illumination devices are typically implemented with one or more light-emitting diodes (LEDs) as light sources and an optical unit, in particular a catadioptric optical unit, for shaping the light beam emanating from the light-emitting diode or the light-emitting diodes and directing the light beam out of the hologram. Lighting devices with such illumination devices typically require a comparatively large installation space for free-beam optical units and/or for the optical components used.

SUMMARY OF THE INVENTION

It is therefore an object of the present application to provide a lighting device in which illumination of a hologram is possible with a reduced installation space.

This object is achieved by a lighting device as claimed in claim 1. The dependent claims define further embodiments.

According to the invention, a lighting device for vehicles is provided, having:
a primary hologram for generating a lighting function in response to illumination with illumination light, and
a secondary hologram system, wherein the secondary hologram system includes:
a waveguide substrate,
an input coupling hologram for coupling light from a light source into the waveguide substrate, and
an output coupling hologram for coupling light out of the waveguide substrate in the form of the illumination light.

Compact illumination of the primary hologram may be achieved by way of the secondary hologram system. The primary hologram is here the hologram that generates the desired lighting signature, while the secondary hologram system is used for the illumination. In particular, by providing a waveguide substrate in connection with the input coupling hologram and the output coupling hologram, a substantially arbitrary arrangement of the secondary hologram system relative to the primary hologram and thus good utilization of the available installation space may be achieved.

The output coupling hologram may have a spatially variable output coupling efficiency. Light may thus be coupled out of the waveguide substrate over a relatively large region, which enables a large region of the primary hologram to be illuminated.

For this purpose, the output coupling efficiency may increase in particular as the distance from the input coupling hologram increases.

The input coupling hologram and/or the output coupling hologram may provide a spectral filter function. This enables broadband light sources to be used without having to provide separate filters.

The input coupling hologram may be configured as a transmission grating or a reflection grating.

The output coupling hologram may also be configured as a transmission grating or a reflection grating.

The output coupling hologram may be arranged on a side of the waveguide substrate facing the primary hologram or on a side of the waveguide substrate facing away from the primary hologram.

A variety of different implementations are thus possible.

The primary hologram may be interchangeable.

Since the primary hologram is interchangeable, the same secondary hologram system may be used together with different primary holograms to generate different lighting signatures.

The primary hologram may be a transmission hologram, a reflection hologram, a reflection hologram with edge illumination, or a transmission hologram with edge illumination.

The lighting device according to the invention is therefore able to be used for different types of primary holograms.

The lighting device may have a plurality of secondary hologram systems comprising the secondary hologram system, wherein the plurality of secondary hologram systems are configured to direct respective illumination light onto the primary hologram.

The primary hologram may here implement a plurality of lighting functions, wherein one or more lighting functions of the plurality of lighting functions are assigned to the plurality of secondary hologram systems.

By providing a plurality of secondary hologram systems, light may be coupled in from different directions, in particular at different edges, of the primary hologram, and different lighting functions may be implemented.

The lighting device may furthermore have the light source, wherein the input coupling hologram is arranged on a side of the waveguide substrate facing the light source or on a side of the waveguide substrate facing away from the light source.

Various possible arrangements for the input coupling hologram and/or the output coupling hologram allow greater freedom when designing the lighting device.

BRIEF DESCRIPTION OF THE DRAWINGS

The invention will be explained in detail below on the basis of different embodiments, with reference being made to the attached drawings. In the figures.

DETAILED DESCRIPTION OF THE INVENTION

Various embodiments of the present invention will be explained in detail below. These embodiments serve merely for illustration purposes and should not be interpreted as restrictive. Variations, modifications, and details that are described for one of the embodiments are also applicable to other embodiments and are therefore not described again. Features of different described embodiments may be combined with one another. For example, different details of lighting devices and variations of these details are explained with reference to different figures, and the variations and details described with reference to different figures are freely combinable with one another. All the figures show cross-sectional views of lighting devices or parts thereof, unless otherwise noted in the respective description of the figures. In the figures, the same reference signs indicate the same or corresponding elements, and the corresponding description of such elements is not repeated.

Figure 1:
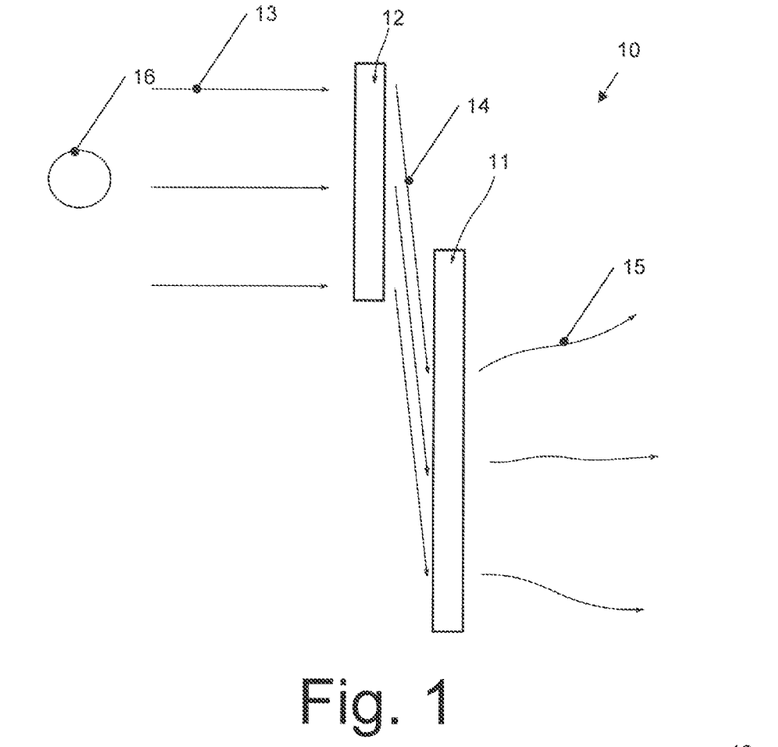
FIG. 1 shows a schematic illustration of a lighting device according to an embodiment.

FIG. 1 shows a schematic view of a lighting device 10 according to an embodiment. The lighting device 10 comprises a light source 16, a secondary hologram system 12, and a primary hologram 11. The light source 16 may comprise one or more light-emitting diodes or other light sources, such as laser light sources or white light sources, in order to generate light rays 13 that are fed to the secondary hologram system 12. The secondary hologram system 12 deflects the received light rays 13 to form illumination light 14 which is incident on the primary hologram 11 at a specified angle. This specified angle is selected here such that the primary hologram 11 generates an image recorded in the primary hologram 11 in accordance with image light rays 15 as a response to being illuminated with the illumination light 14. The recorded image may in particular define a lighting signature, as described in the introductory part, in order to give the light of the lighting device 10 an appearance as desired by a designer. The specified angle corresponds in particular to an angle at which the hologram 11 was illuminated with what is referred to as a reference ray during the recording, as is familiar to those skilled in the field of holography. The function of the primary hologram 11 of generating an image for implementing the lighting is also referred to as the lighting function in the context of the present application.

By using the secondary hologram system 12, a compact arrangement may be provided. In addition, the lighting device 10 of FIG. 1 may be designed as a modular system in which the primary hologram 11 is interchangeable. The secondary hologram system 12 provides the illumination light 14 with a defined characteristic, and any primary hologram 11 that generates an image in response to being illuminated with said defined characteristic may be used in the lighting device 10 of FIG. 1. Different lighting signatures may thus be generated merely by interchanging the primary hologram 11, while the rest of the lighting device 10 may remain unchanged. This facilitates the design and manufacture of such lighting devices.

It should be noted that the primary hologram 11 may have a single hologram or a plurality of individual holograms, depending on the desired lighting signature.

As will be explained in detail later, different types of holograms, such as transmission holograms, reflection holograms, or edge-illuminated holograms, may be used as the primary hologram 11.

An example of the structure of the secondary hologram system 12 according to some embodiments will now be explained in more detail with reference to FIG. 2. Variations of this structure will be explained later with reference to FIGS. 4 and 5.

Figure 2:
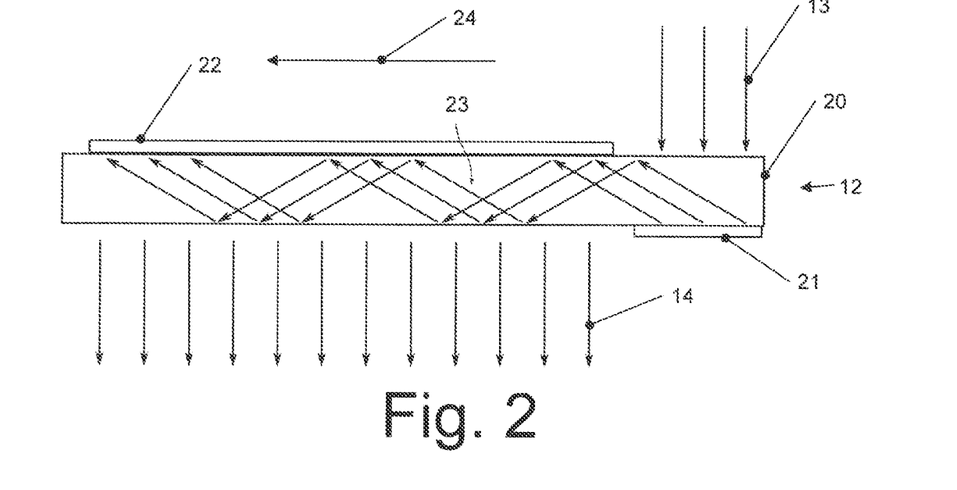
FIG. 2 shows a cross-sectional view of a secondary hologram system according to an embodiment.

In the embodiment of FIG. 2, the secondary hologram system 12 has a substrate 20, which serves as a waveguide, an input coupling hologram 21, and an output coupling hologram 22. The substrate that provides the waveguide function is also referred to in the present application as the waveguide substrate for short.

The waveguide substrate 20 is made of a material that is transparent to the wavelength of the light used, for example of a glass or a transparent plastic. The light rays 13 coming from the light source (for example light source 16 in FIG. 1) are incident on the input coupling hologram 21. In the example of FIG. 2, the light rays 13 are incident approximately perpendicularly on the waveguide substrate 20 and then reach the input coupling hologram 21 arranged on the opposite side of the waveguide substrate 20. Other possible configurations will be explained later with reference to FIG. 4.

The input coupling hologram 21 is designed as a holographic grating and directs the light rays 13 into the waveguide substrate 20 at an angle that (measured to the perpendicular) is greater than the angle of total internal reflection at the interface between the waveguide substrate 20 and the environment. This produces light 23 that has been coupled into the waveguide substrate 20. The coupled-in light 23 then impinges on the output coupling hologram 22 as shown. The output coupling hologram 22 in turn is designed as a holographic grating that deflects the coupled-in light 23 at an angle such that it exits the waveguide substrate 20 as the illumination light 14, in the example in FIG. 2 perpendicular to the waveguide substrate 20. Other angles are also possible here, provided the angle is smaller than the angle of total internal reflection and thus light is coupled out.

Holographic gratings that are used by the input coupling hologram 21 and the output coupling hologram 22 are generally wave-selective in the case of reflection gratings, that is to say only light of a specific wavelength or a narrow wavelength range is diffracted into the respectively desired direction. The secondary hologram system 12 may thus also implement a filter function by using reflection gratings, with the result that only illumination light 14 of one wavelength or one wavelength range for which the respective primary hologram 11 is designed reaches the primary hologram 11. This is of particular interest when relatively broadband light sources are used as the light source 16. Such a spectral filter function may be implemented by the input coupling hologram 21, by the output coupling hologram 22, or by both holograms 21, 22. This filtering may reduce chromatic dispersion, which could otherwise lead to blurring in the image.

In the embodiment of FIG. 2, the output coupling hologram 22 has a relatively large extent in the direction of an arrow 24. In the embodiment of FIG. 2, the output coupling hologram 22 has an increasing output coupling efficiency in the direction of the arrow 24, that is to say the holographic grating of the output coupling hologram 22 is set up in such a way that it couples an increasingly larger proportion of the light incident on the output coupling hologram 22 in the form of illumination light 14 out of the hologram, while a remaining proportion of the light is in each case guided in the waveguide substrate 20 in order to again be incident on the output coupling hologram 22 after reflections in the waveguide substrate 20. In this way, the illumination light 14 may be coupled out over a large area.

Figure 3A:
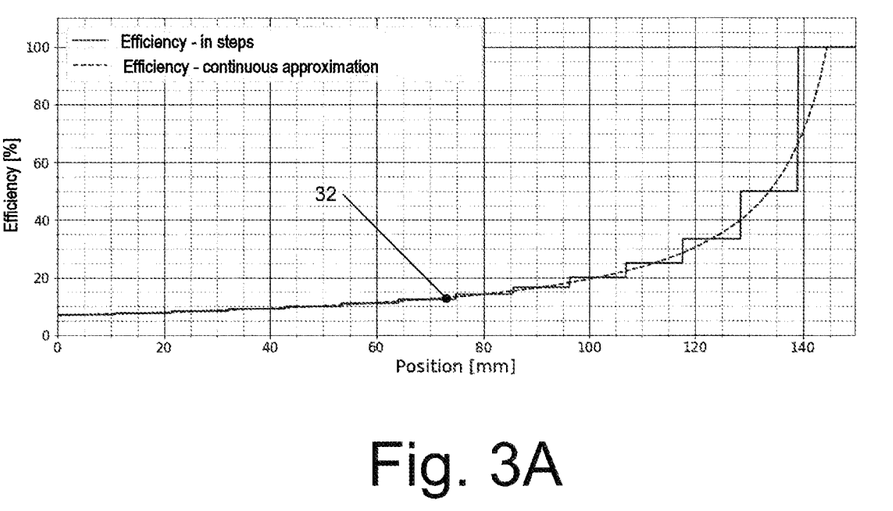
FIGS. 3A and 3B show graphs for illustrating properties of an output coupling hologram of the secondary hologram system of FIG. 3, FIGS. 4A-4D show different variants for input coupling holograms of a secondary hologram system according to some embodiments.
Figure 3B:
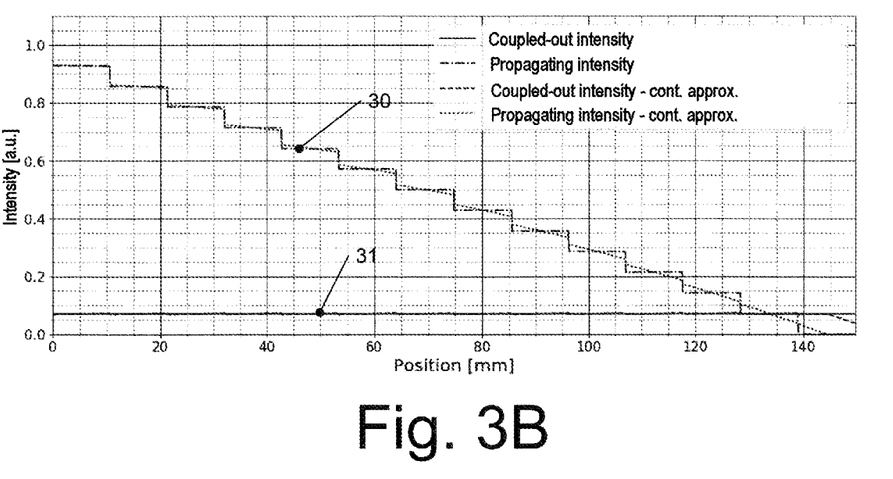

An example of such a variable output coupling efficiency in the direction of arrow 24 is shown in FIGS. 3A and 3B. In FIGS. 3A and 3B, the x-axis shows a position along the output coupling hologram 22 in the direction of the arrow 24 of FIG. 2. An output coupling hologram with a length of 150 mm in the direction of the arrow 24, a thickness of the waveguide substrate 20 of 2 mm, and an angle of the coupled-in light 23 within the waveguide substrate 20 of 70° was used here as an example of an output coupling hologram. These values are given merely as an example, and other configurations are likewise possible.

Curves 32 in FIG. 3A show the output coupling efficiency in %, that is to say indicate what proportion of the light incident on the output coupling hologram is coupled out. The remaining proportion is then guided in the waveguide substrate in order to be incident on the output coupling hologram again.

Curves 30 in FIG. 3B show the intensity of the wave propagating in the waveguide substrate 30. This intensity decreases continuously because in each case a proportion of the light is coupled out. Curves 31 show the coupled-out intensity. Due to the increasing output coupling efficiency, the coupled-out intensity is approximately constant, since an increasingly larger proportion of the decreasing intensity according to curves 30 is coupled out due to the increasing efficiency according to curves 32.

The curves 30-32 each have a first curve that shows a step-wise configuration which is technically easy to implement, that is to say the properties of the output coupling hologram 22 are changed in steps and then remain the same for a specific region. A second curve shows a continuous approximation of this step-wise behavior.

By using such a varying output coupling efficiency, uniform illumination of the primary hologram over a large area may be implemented. The output coupling efficiency thus increases as the distance from the input coupling hologram increases.

Different variations and modifications of the lighting device 10 of FIG. 1 and components thereof will now be discussed. First, different possible arrangements of the input coupling hologram 21 will be explained with reference to FIGS. 4A to 4D.

Figure 4A:
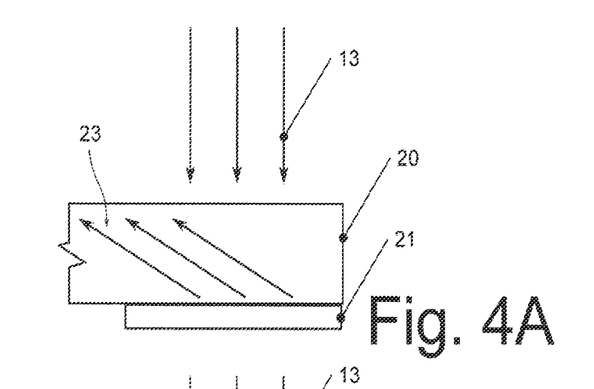

FIG. 4A shows the configuration already briefly discussed with reference to FIG. 2. Here, the input coupling hologram 21 is arranged on a side of the waveguide substrate 20 that is opposite to the side on which the light rays 13 are incident. The input coupling hologram 21 operates here as a reflection grating, that is to say the light 13 is diffracted at the desired angle in reflection by the input coupling hologram 21 to form the coupled-in light 23.

Figure 4B:
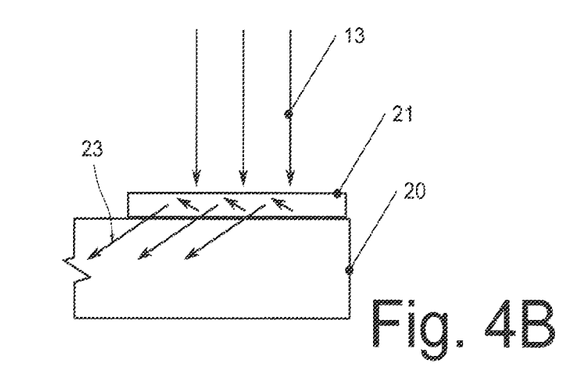

In the configuration of FIG. 4B, the input coupling hologram 21 is arranged on the same side of the waveguide substrate 20 on which the light 13 is incident on the waveguide substrate 20. The input coupling hologram 21 here also operates as a reflection grating and reflects the incident light at a desired angle to a side of the input coupling hologram 21 facing away from the waveguide substrate 20. This light that is diffracted in this way undergoes total internal reflection at the interface between the input coupling hologram 21 and the environment and thus enters the waveguide substrate 20 as coupled-in light 23.

Figure 4C:
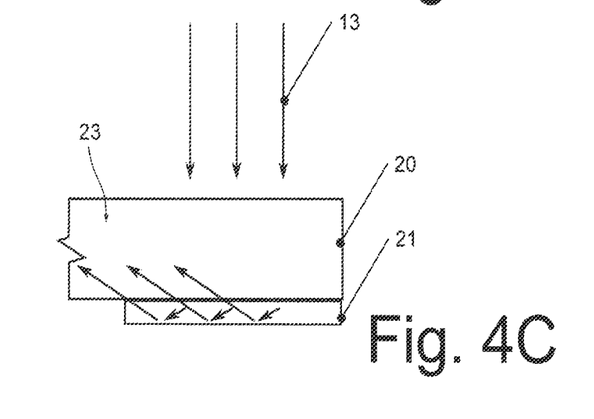

In the variant of FIG. 4C, as in FIG. 4A, the input coupling hologram is arranged on a side of the waveguide substrate 20 that lies opposite the side on which the light 13 is incident. The input coupling hologram 21 operates here as a transmission grating, that is to say the incident light 13 is diffracted at an angle in the direction of a side of the input coupling hologram 21 facing away from the waveguide substrate 20 and undergoes total internal reflection at the interface between the input coupling hologram 21 and the environment to enter the waveguide substrate 20 as coupled-in light 23.

Figure 4D:
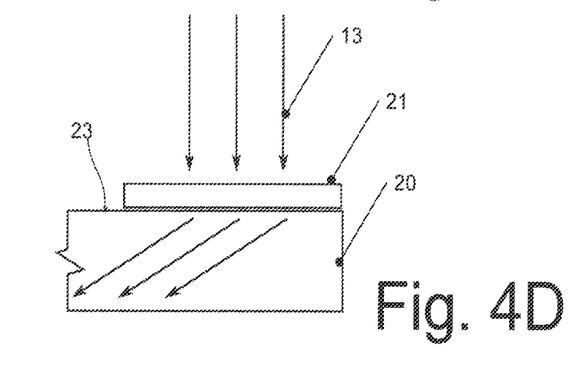

In variant 4D, the input coupling hologram 21 is arranged on that side of the waveguide substrate 20 on which the light 13 is incident on the waveguide substrate 20, and is designed as a transmission grating. The light 13 is thus diffracted by the input coupling hologram 21 and directed as coupled-in light 23 into the waveguide substrate.

Corresponding variants, as shown for the input coupling hologram 21 with reference to FIGS. 4A to 4D, are also possible for the output coupling hologram 22. This will now be explained with reference to FIGS. 5A to 5D.

Figure 5A:
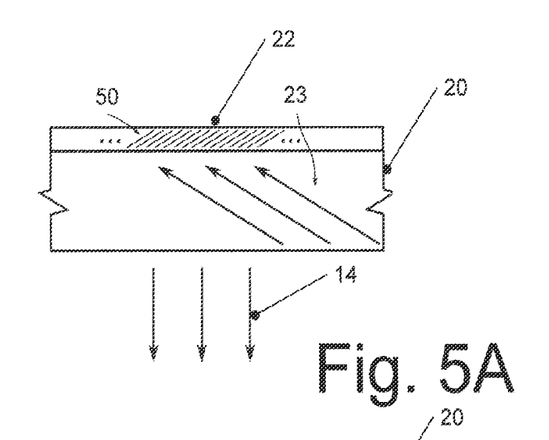
FIGS. 5A-5D show different variants for output coupling holograms of a secondary hologram system according to some embodiments.

FIG. 5A shows a configuration as already shown with reference to FIG. 2. Here, the output coupling hologram 22 is arranged on a side of the waveguide substrate 20 which lies opposite the side on which the illumination light 14 is coupled out. The output coupling hologram 22 operates here as a reflection grating and diffracts the coupled-in light 23 in a direction that enables output coupling from the waveguide substrate 20, in particular substantially perpendicular to a surface of the waveguide substrate 20, by Bragg planes 50 of the output coupling hologram 22.

Figures 5B, 5D:
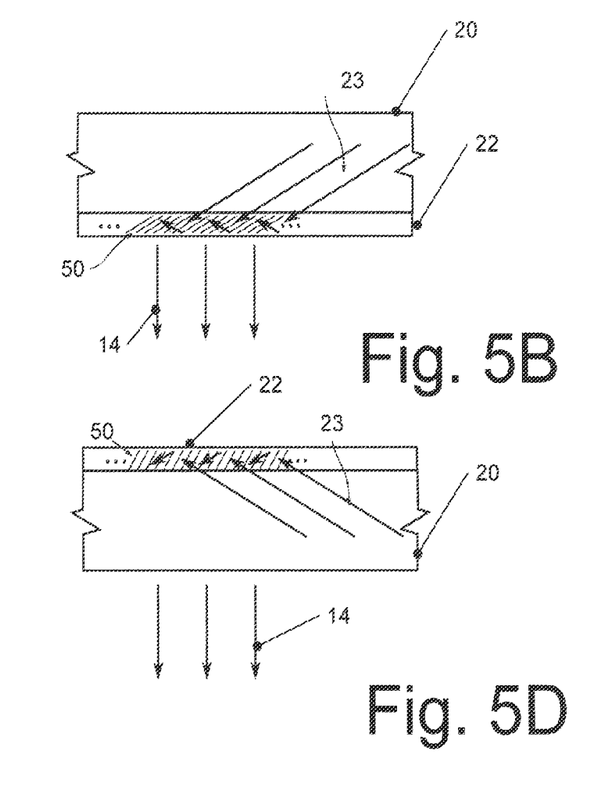

In FIG. 5B, the output coupling hologram 22 is arranged on the same side of the waveguide substrate on which the illumination light 14 is coupled out, and also operates as a reflection grating. The coupled-in light 23 here initially travels without diffraction through the output coupling hologram to a side of the output coupling hologram 22 facing away from the waveguide substrate 20, is reflected there and then diffracted by the output coupling hologram 22 to be coupled out as illumination light 14.

Figure 5C:
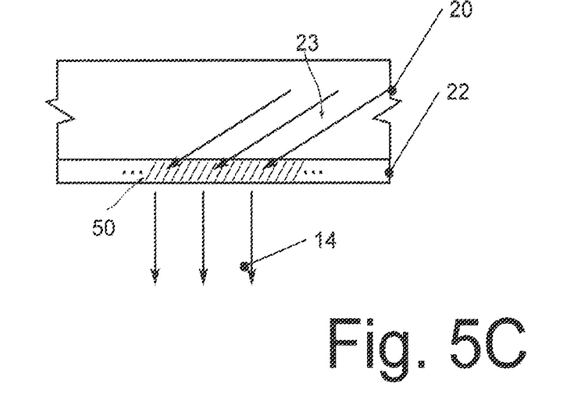

In the variant of FIG. 5C, the output coupling hologram is arranged on the same side of the waveguide substrate 20 on which the illumination light 14 is coupled out. The output coupling hologram 22 operates here as a transmission grating and diffracts the coupled-in light 23 in a direction that enables it to be coupled out as illumination light 14, for example in a direction substantially perpendicular to the interface between the output coupling hologram 22 and the environment.

In the variant of FIG. 5D, the output coupling hologram 22 is finally arranged on a side of the waveguide substrate 20 that lies opposite the side on which the illumination light 14 is coupled out, and operates as a transmission grating. In this case, the coupled-in light 23 first travels through the output coupling hologram 22, is reflected on a side of the output coupling hologram 22 that lies opposite the waveguide substrate 20 and then diffracted by Bragg planes 50 to be coupled out as illumination light 40.

Even though the light 13 in FIGS. 4 and 5 is incident on the waveguide substrate 20 perpendicularly and the illumination light 14 is coupled out of the waveguide substrate perpendicularly, other angles are also possible, as shown, for example, in FIG. 1 by way of the illumination light 14. For such angles, configurations for coupling out as shown in FIG. 5C are particularly suitable, that is to say by means of an output hologram that operates as a transmission grating and is arranged on the same side on which the light is coupled out, or, for coupling in, the configuration in FIG. 4B or FIG. 4D, in which the input coupling hologram 21 is arranged on that side of the waveguide substrate on which the light 13 is incident.

The secondary hologram system 12 may be used in connection with different types of primary holograms, in particular transmission holograms, reflection holograms, or edge-illuminated holograms. This will now be explained with reference to FIGS. 6A to 6B.

Figure 6A:
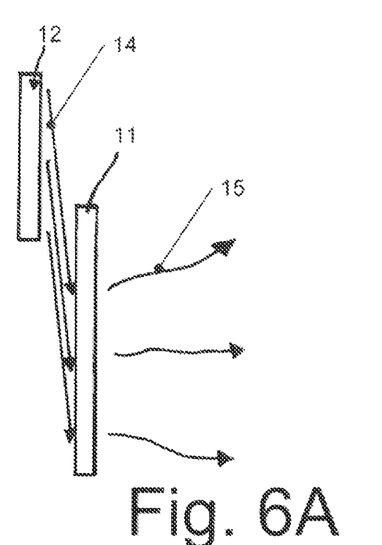
FIGS. 6A-6D show different variants for primary holograms of lighting devices according to some embodiments.

FIG. 6A shows a configuration in which, as in FIG. 1, the primary hologram 11 operates as a transmission hologram. This means that the illumination light 14 is incident on one side of the primary hologram 11, is diffracted in transmission by the hologram 11 according to the image recorded in the hologram 11, and the image light rays 15 then emanate from a side of the hologram 11 that lies opposite the side on which the illumination light 14 is incident.

Figure 6B:
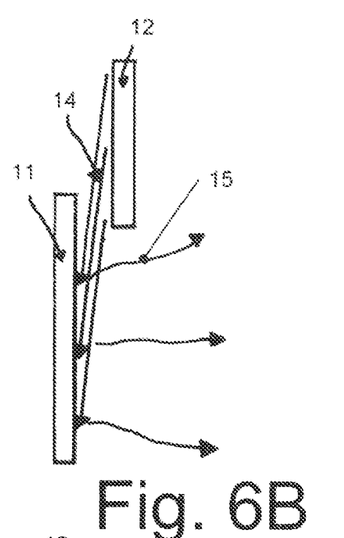

FIG. 6B shows a configuration in which the primary hologram 11 is designed as a reflection hologram. Here, the illumination light 14 falls on the same side of the primary hologram 11 from which the image light rays 15 emanate, in that the primary hologram 11 diffracts the illumination light 14 in a corresponding light direction.

Figure 6C:
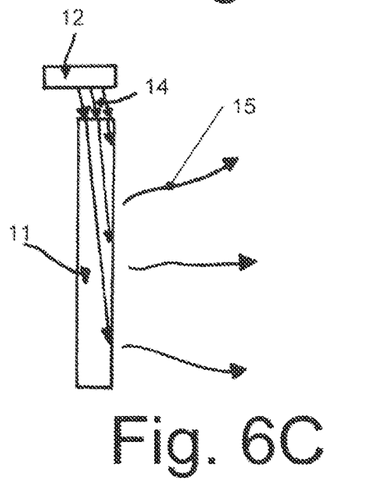
Figure 6D:
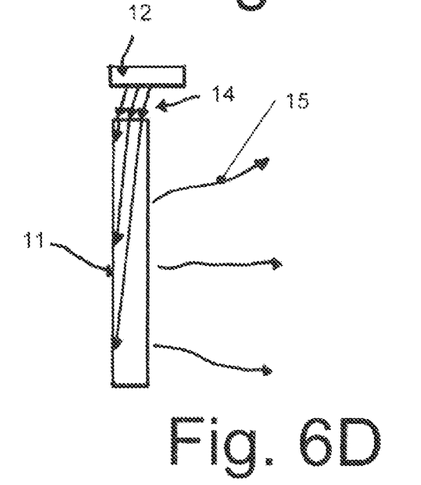

Finally, FIGS. 6C and 6D show the possibility of edge-illuminated holograms, wherein both transmission holograms (FIG. 6C) and reflection holograms (FIG. 6D) may be used as the primary hologram 11. In this case, edge-illuminated means that the illumination light 14 is coupled into the primary hologram 11 via a side surface thereof, as shown in FIGS. 6C and 6D.

In the case of FIG. 6C, the illumination light 14 is coupled into the primary hologram 11 in one direction toward the side from which the image light rays 15 emanate. The primary hologram 11 then substantially operates as a transmission hologram. In the case of FIG. 6D, as shown in FIG. 6B, the illumination light 14 is coupled in towards the side of the primary hologram 11 which lies opposite the side from which the image light rays 15 emanate. Here, the primary hologram 11 operates substantially as a reflection hologram. All of these configurations may be implemented in lighting devices according to the present invention and combined with the different variants for the secondary hologram system discussed with reference to FIGS. 2-5.

Figure 7A:
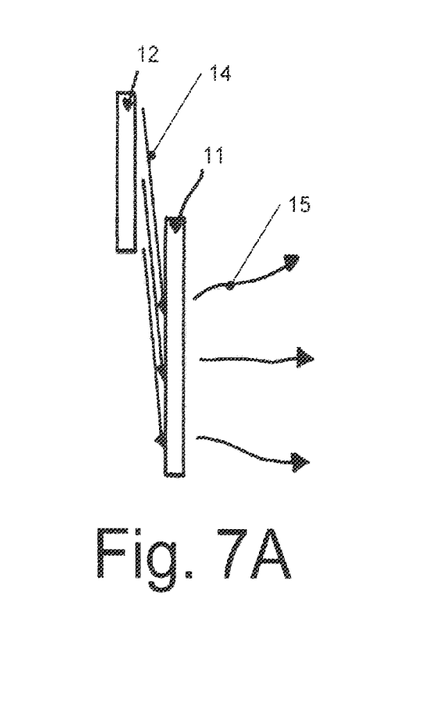
FIGS. 7A-7C show different variants of the positioning of the secondary hologram system and primary hologram according to different embodiments.
Figure 7B:
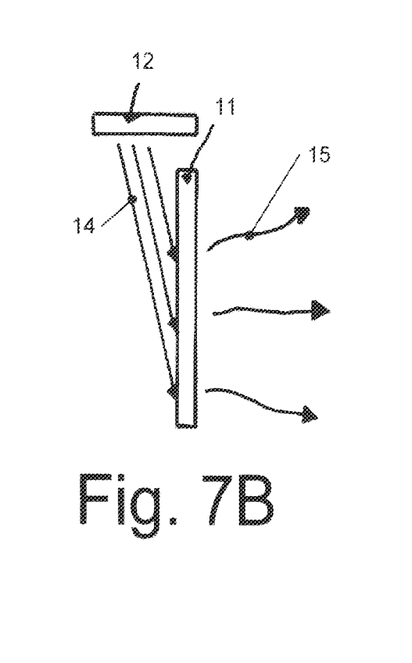
Figure 7C:
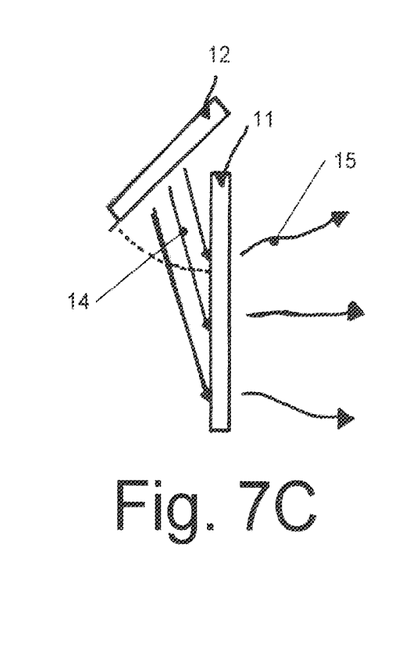

The secondary hologram system 12 may be positioned at different angles in space with respect to the primary hologram 11, wherein angles at which the illumination light 14 exits the secondary hologram system may be adapted accordingly. Examples of this will now be explained with reference to FIG. 7.

The arrangement in FIG. 7A substantially corresponds to the arrangement in FIG. 1. Here, a side of the secondary hologram system 12 from which the illumination light 14 is emitted is parallel to a side of the primary hologram at which the illumination light 14 is received. In FIG. 7B, these sides are perpendicular to one another. In FIG. 7C, an angle is chosen between the parallel arrangement of FIG. 7A and the vertical arrangement of FIG. 7B. The angle may be selected substantially arbitrarily if the direction in which the illumination light 14 emanating from the secondary hologram system 12 is emitted is adapted accordingly. In FIGS. 7A-7C, the primary hologram 11 is a transmission hologram. Corresponding different arrangements are, however, also possible with reflection holograms as shown in FIG. 6B or with edge-illuminated holograms as shown in FIGS. 6C and 6D.

Figure 8:
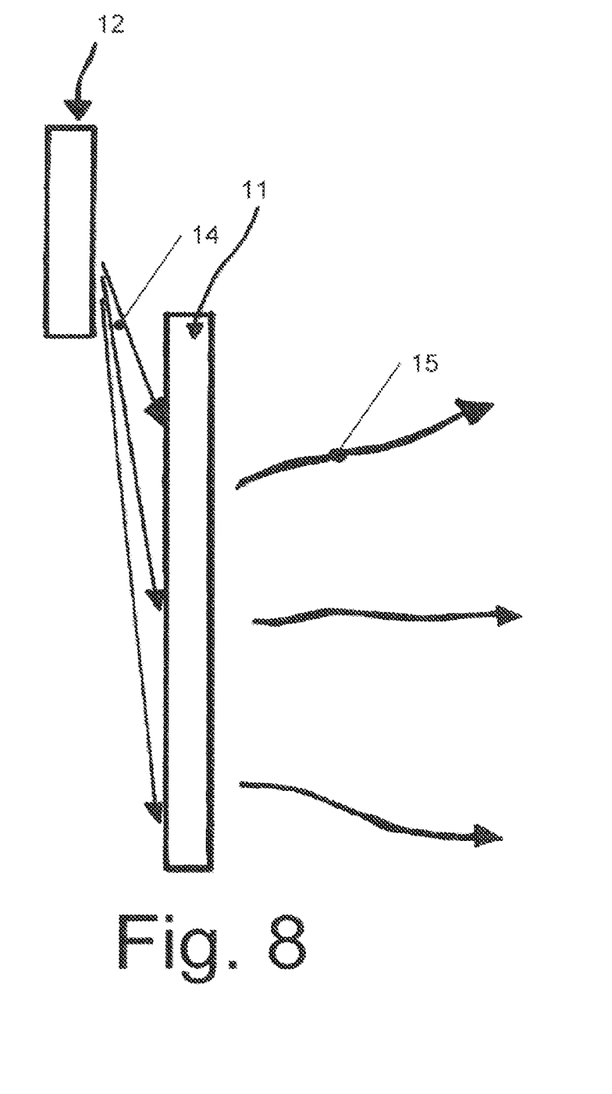
FIG. 8 shows a lighting device with divergent illumination of a primary hologram according to some embodiments.

In the previous exemplary embodiments, the secondary hologram system 12 generates collimated illumination light 14, that is to say the light rays of the illumination light 14 are substantially parallel to one another. However, other types of illumination light, for example divergent or convergent illumination light, are also possible in principle. FIG. 8 shows a lighting device in which the illumination light 14 emanating from the secondary hologram system 12 diverges. In the arrangement of FIG. 8, this leads to the illumination light being incident at different locations on the primary hologram 11 at different angles. Accordingly, the primary hologram 11 may in this case be designed to form the desired image at different locations in response to light that is incident at respective different angles. This may be done, for example, by a reference beam diverging in a corresponding manner when creating the primary hologram 11. The divergence may diverge in one direction, that is to say for example only in the direction shown in the cross-sectional view of FIG. 8, and be collimated in a direction perpendicular thereto, that is to say be substantially parallel, but it may also diverge in two directions. However, in many cases a collimated illumination light 14 will be preferred.

The orientation of the primary hologram 11 itself to a direction in which the image is to be generated by the light rays 15 may also be varied within the limits set by the technology of the hologram 11 (its extent and the desired image size).

In the exemplary embodiments discussed so far, a secondary hologram system and a primary hologram 11 are provided in each case. However, a plurality of secondary hologram systems may also be used to illuminate a primary hologram with different wavelengths and/or at different angles, for example in order to selectively generate different images and thus implement different lighting functions. In this case, a plurality of images are recorded in the primary hologram 11, for example in the same layer of the primary hologram 11 or in layers lying one above the other. Since holograms are angle-selective and wavelength-selective, a corresponding image is reconstructed only when illuminated at a corresponding angle (which in many cases corresponds to an angle of a reference ray during the recording of the image) and with a corresponding wavelength (that corresponds to the wavelength of the rays used for recording). An example of such a lighting device is shown in FIGS. 9A and 9B.

Figure 9A:
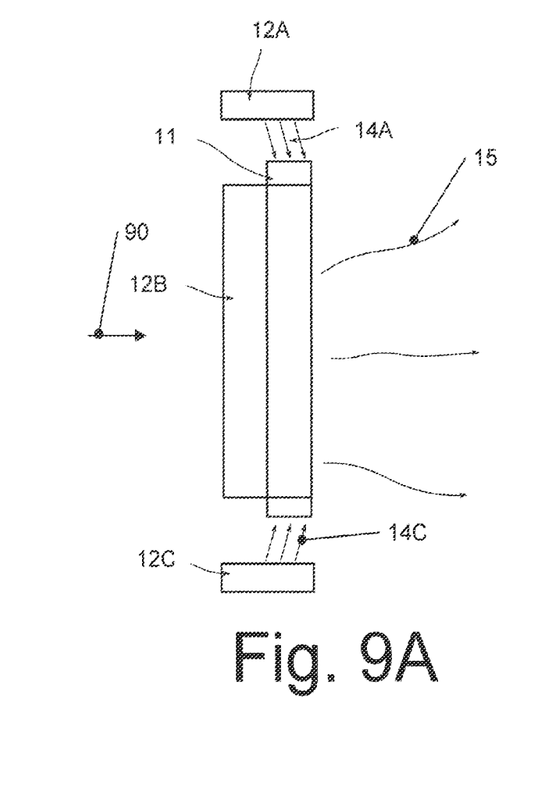
FIGS. 9A and 9B show an embodiment of a lighting device with a plurality of secondary hologram systems.
Figure 9B:
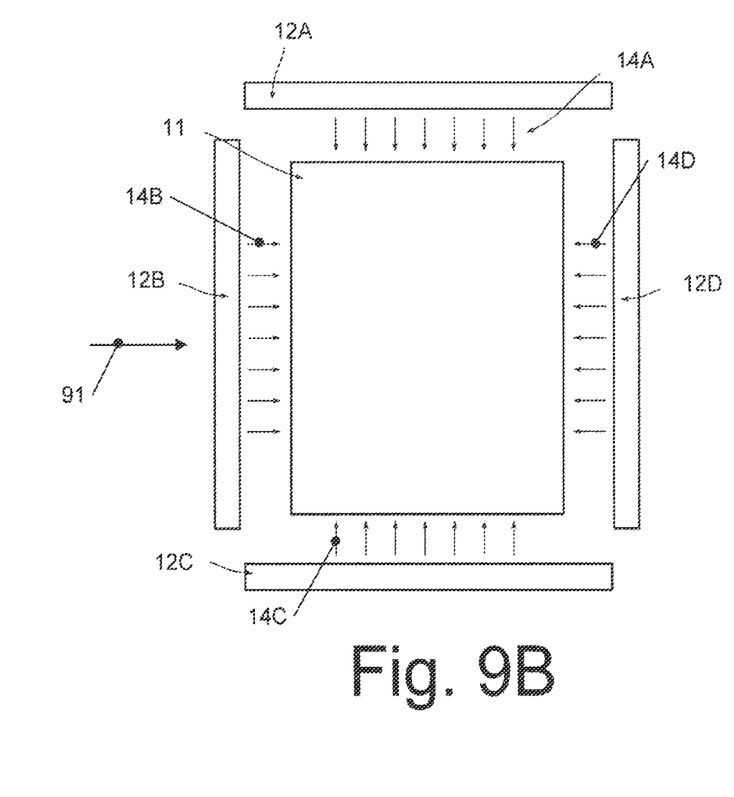

FIG. 9A shows a side view of a lighting device, and FIG. 9B shows a plan view. The top view of FIG. 9B is in this case a plan view in a viewing direction indicated by an arrow 90 in FIG. 9A, and the side view of FIG. 9A is a side view in a viewing direction indicated by an arrow 91 in FIG. 9B.

The embodiment of FIGS. 9A and 9B has a primary hologram 11 and four secondary hologram systems 12A, 12B, 12C and 12D. In the arrangement of FIGS. 9A and 9B, the primary hologram 11 is an edge-illuminated hologram, wherein illumination light 14A to 14D emanating from the respective secondary hologram systems 12A to 12D is coupled into the primary hologram 11 via different edges and thus enter the primary hologram 11 at different angles. "Different angles" may mean in this case different absolute angle values, but also different spatial directions with the same angle value, or both. By selectively activating light sources that are assigned to the secondary hologram systems 12A to 12D, different images may thus be generated. This may be utilized, for example, for different lighting functions such as brake light or taillight, or it may be utilized in another way to convey information to drivers of other vehicles. In this way, for example, the form of a taillight function may change as a function of a distance of a vehicle following behind in order to issue a warning to the driver of the vehicle following behind if they are driving too close.

Even though four secondary hologram systems are shown in the embodiment of FIGS. 9A and 9B, other numbers of secondary hologram systems are also possible. In addition, the provision of a plurality of secondary hologram systems is possible not only with an edge-illuminated primary hologram 11, as shown in FIGS. 9A and 9B, but also with the other possibilities discussed with reference to FIGS. 6A to 6D.

In view of the plurality of variations described, it is evident that the present invention is not limited to one specific exemplary embodiment.

What is claimed is:

1. A lighting device for vehicles, having:
   a primary hologram for generating a lighting function in response to illumination with illumination light, and
   a secondary hologram system, wherein the secondary hologram system includes:
     a waveguide substrate,
     an input coupling hologram for coupling light from a light source into the waveguide substrate, and
     an output coupling hologram for coupling light out of the waveguide substrate in the form of the illumination light,
   wherein the primary hologram is spaced apart from the output coupling hologram.

2. The lighting device as claimed in claim 1, wherein the output coupling hologram has a spatially variable output coupling efficiency.

3. The lighting device as claimed in claim 2, wherein the output coupling efficiency increases as the distance from the input coupling hologram increases.

4. The lighting device as claimed in claim 1, wherein at least one of the input coupling hologram or the output coupling hologram provides a spectral filter function.

5. The lighting device as claimed in claim 1, wherein the input coupling hologram is configured as a transmission grating or reflection grating.

6. The lighting device as claimed in claim 1, wherein the output coupling hologram is configured as a transmission grating or reflection grating.

7. The lighting device as claimed in claim 1, wherein the output coupling hologram is arranged on a side of the waveguide substrate facing the primary hologram or on a side of the waveguide substrate facing away from the primary hologram.

8. The lighting device as claimed in claim 1, wherein the primary hologram is interchangeable.

9. The lighting device as claimed in claim 1, wherein the primary hologram is a transmission hologram, a reflection hologram, a reflection hologram with edge illumination, or a transmission hologram with edge illumination.

10. The lighting device as claimed in claim 1, wherein the lighting device has a plurality of secondary hologram systems comprising the secondary hologram system, wherein the plurality of secondary hologram systems are configured to direct respective illumination light onto the primary hologram.

11. The lighting device as claimed in claim 10, wherein the primary hologram implements a plurality of lighting functions, wherein one or more lighting functions of the plurality of lighting functions are assigned to the plurality of secondary hologram systems.

12. The lighting device as claimed in claim 1, furthermore including the light source, wherein the input coupling hologram is arranged on a side of the waveguide substrate facing the light source or on a side of the waveguide substrate facing away from the light source.

13. The lighting device as claimed in claim 1, wherein the output coupling hologram is configured to deflect light out of the waveguide substrate to provide the illumination light incident at a predetermined angle on the primary hologram, the predetermined angle selected such that the primary hologram generates an image.

14. A lighting device for vehicles, having:
    a primary hologram for generating a lighting function in response to illumination with illumination light, and
    a secondary hologram system, wherein the secondary hologram system includes:
      a waveguide substrate,
      an input coupling hologram for coupling light from a light source into the waveguide substrate, and
      an output coupling hologram for coupling light out of the waveguide substrate in the form of the illumination light,
    wherein the output coupling hologram is configured to deflect light out of the waveguide substrate to provide the illumination light incident at a predetermined angle on the primary hologram, the predetermined angle selected such that the primary hologram generates an image.

\* \* \* \* \*